United States Patent
El Idrissi et al.

(10) Patent No.: US 10,878,735 B2
(45) Date of Patent: Dec. 29, 2020

(54) SEGMENTED LIGHTING ASSEMBLY FOR A MOTOR VEHICLE

(71) Applicant: Valeo Vision, Bobigny (FR)

(72) Inventors: Hafid El Idrissi, Bobigny (FR); Frantz Pelissier, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 16/229,705

(22) Filed: Dec. 21, 2018

(65) Prior Publication Data

US 2019/0197934 A1    Jun. 27, 2019

(30) Foreign Application Priority Data

Dec. 22, 2017  (FR) ..................................... 17 63129

(51) Int. Cl.
| | |
|---|---|
| *G09G 3/06* | (2006.01) |
| *G09G 5/02* | (2006.01) |
| *F21S 41/125* | (2018.01) |
| *B60Q 1/08* | (2006.01) |
| *B60Q 1/14* | (2006.01) |

(52) U.S. Cl.
CPC ............... *G09G 3/06* (2013.01); *B60Q 1/085* (2013.01); *B60Q 1/1415* (2013.01); *F21S 41/125* (2018.01); *G09G 5/02* (2013.01); *B60Q 2300/41* (2013.01); *B60Q 2300/45* (2013.01); *G09G 2380/10* (2013.01)

(58) Field of Classification Search
CPC . G09G 3/06; G09G 5/02; G09G 3/346; H05B 33/00
See application file for complete search history.

(56) References Cited

U.S. PATENT DOCUMENTS

| | | | |
|---|---|---|---|
| 4,794,269 A | 12/1988 | Kawata et al. | |
| 2005/0063194 A1* | 3/2005 | Lys | B60Q 1/2696 362/545 |
| 2005/0162737 A1* | 7/2005 | Whitehead | H04N 9/3102 359/454 |
| 2005/0269481 A1* | 12/2005 | David | G02B 27/01 250/208.1 |

(Continued)

FOREIGN PATENT DOCUMENTS

| | | |
|---|---|---|
| DE | 10 2008 060 947 A1 | 9/2009 |
| DE | 11 2013 003 050 T5 | 3/2015 |

(Continued)

OTHER PUBLICATIONS

French Preliminary Search Report dated Aug. 16, 2018 in French Application 17 63129, filed on Dec. 22, 2017 ( with English Translation of Categories of Cited Documents).

(Continued)

*Primary Examiner* — Kevin M Nguyen
(74) *Attorney, Agent, or Firm* — Oblon, McClelland, Maier & Neustadt, L.L.P.

(57) ABSTRACT

A plurality of luminous modules able to emit a segmented light beam to be controlled by a common control processor having a single video output interface, while maintaining the ability to project different outlines with each luminous module. This decreases the number of connections necessary between a control unit and a plurality of luminous modules, thereby decreasing the complexity of the system, and decreasing the production cost thereof.

19 Claims, 2 Drawing Sheets

(56) References Cited

U.S. PATENT DOCUMENTS

Figure 1:
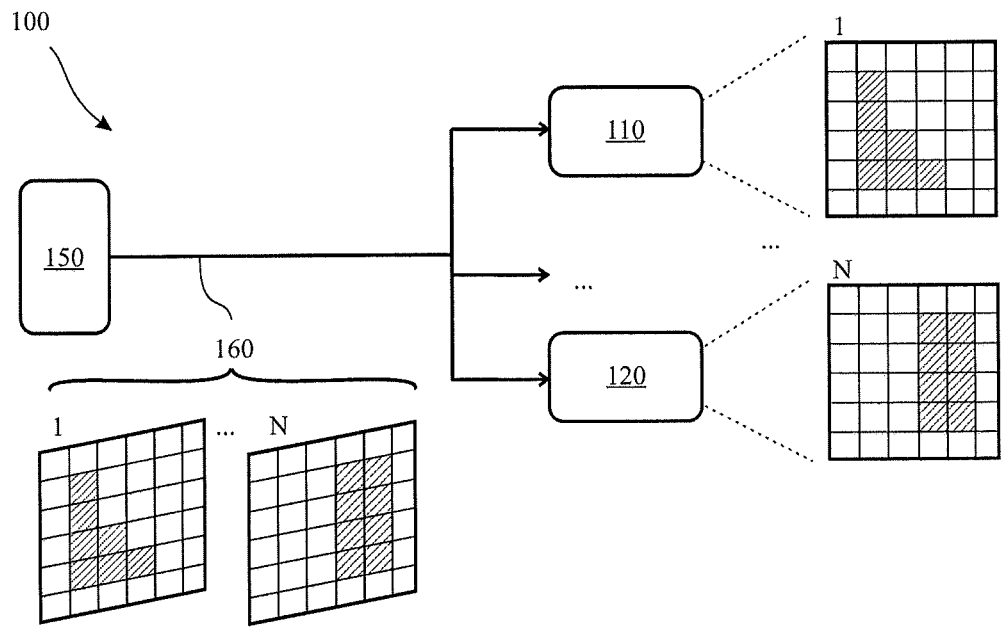

| | | | | |
|---|---|---|---|---|
| 2012/0038693 A1* | 2/2012 | Kang | ................ | H04N 9/3197 345/691 |
| 2015/0186098 A1* | 7/2015 | Hall | ................ | G06F 3/147 345/1.3 |
| 2015/0191115 A1 | 7/2015 | Yamamura et al. | | |
| 2016/0265733 A1 | 9/2016 | Bauer et al. | | |

FOREIGN PATENT DOCUMENTS

| | | |
|---|---|---|
| DE | 10 2015 120 204 A1 | 5/2017 |
| WO | WO 2015/058227 A1 | 4/2015 |

OTHER PUBLICATIONS

Office Action dated Oct. 26, 2020 issued in corresponding Chinese patent application No. 201811579307.6 (with translation).

* cited by examiner

SEGMENTED LIGHTING ASSEMBLY FOR A MOTOR VEHICLE

The invention relates to lighting assemblies for motor vehicles, and in particular to such assemblies comprising light sources capable of emitting segmented light beams, e.g., pixelated or matrix light beams.

In the automotive field, the use of pixelated or matrix-array lighting devices is increasingly recommended. Below, the term "segmented" will be applied to such lighting devices. Such devices are able to project a light beam having a footprint and an outline that are set by a digital image delivered by a control module such as a processor of images or video images. It is for example a question of liquid-crystal-display devices each light-flux-emitting pixel of which may be controlled independently. Other segmented lighting devices comprise monolithic matrix-array sources comprising light-emitting semiconductor elements. In such sources, semiconductor elements of the light-emitting-diode (LED) type are produced on a common substrate and arranged in the form of a matrix array. Each of the LEDs of the matrix array may be controlled independently. Another alternative is that of digital micromirror devices (DMDs). In a DMD, a light source illuminates a matrix array of micromirrors. The position of each micromirror is controlled independently of the other micromirrors of the matrix array by a precision mechanical device. The relative position of a micromirror with respect to the light source determines whether the light incident on the mirror is reflected toward the exit of the device, or whether the light beam is formed, or not. In this way a segmented light beam is produced. Yet another variant is given by laser scanning devices, such as are described by way of example in patent document EP 269 0352.

It is known to control luminous modules able to emit segmented light beams using digital images. Each pixel or group of pixels of the digital image determines the state of a pixel/segment of the lighting device. Using known solutions, it is necessary to provide a processor capable of generating a digital control image for each luminous module of a motor vehicle, if the latter is equipped with a plurality of segmented-beam luminous modules. This on the one hand requires a high number of connections between the control processors and the luminous modules, and on the other hand the implementation of a high number of control processors, which are relatively voluminous and expensive on account of the restricted space available in a motor vehicle.

The objective of the invention is to mitigate at least one of the problems posed by the prior art. More precisely, the objective of the invention is to propose a lighting assembly which comprises a plurality of luminous modules that are able to emit a segmented light beam and that are controlled by a single control processor, while maintaining the ability to project different outlines with each luminous module.

According to a first aspect of the invention, a lighting assembly for a motor vehicle is proposed. The assembly comprises a plurality of luminous modules, each luminous module being able to emit a segmented light beam. The lighting assembly is noteworthy in that it comprises at least one control unit that is common to a plurality of luminous modules, the control unit being suitable for transmitting, by means of a communication channel, the same digital control image comprising a plurality of digital image channels to each of said modules. The lighting assembly is furthermore noteworthy in that each luminous module is suitable for projecting a segmented light beam determined by a subset of the channels of the received digital control image.

Preferably, the lighting assembly may comprise a single control unit, common to each of the modules of the plurality of luminous modules. Preferably, the control unit may have a single video output interface for serving the luminous modules.

Each luminous module may preferably be suitable for projecting a segmented light beam determined by one of the channels of the digital control image.

Preferably, at least one of the luminous modules may be suitable for projecting a segmented light beam determined by the combination of at least two of the channels of the digital control image.

The control unit may preferably comprise a plurality of data outputs, each of the data outputs being configured to transmit the digital control image to one of the luminous modules.

Alternatively, preferably, the control unit may comprise a data output, configured to transmit the digital control image to a first of the luminous modules, said first module being configured to repeat the received digital control image to at least one other luminous module of the assembly.

The luminous modules may preferably be connected in a chain or in series, so that each module of the arrangement, except the first, is configured to receive the digital control image from the unit of the luminous module that precedes it in the chain.

Preferably, the luminous modules may be capable of projecting a segmented beam having a resolution of at least 800 and preferably of at least 1000 segments.

The control unit may, preferably, be configured to transmit a sequence of digital control images to the luminous modules.

Preferably, the digital control images transmitted by the control unit may be transmitted at a frequency between 30 Hz and 100 Hz, preferably between 50 Hz and 100 Hz and even more preferably at a frequency of 60 Hz.

The digital control image may preferably comprise three image channels, in particular a red image channel, a green image channel and a blue image channel, and the lighting assembly may comprise three luminous modules, each of which is configured so as to project a segmented beam according to one of said three channels, respectively.

Preferably, each luminous module may comprise a digital micromirror device (DMD) or a monolithic matrix-array source comprising electroluminescent semiconductor elements, or a liquid-crystal display, or a laser-scanning projecting device.

Preferably, the luminous modules of the lighting assembly may be distributed between different exterior luminous devices, such as headlamps or lights, of a motor vehicle, for example right and left and/or front and rear exterior luminous devices.

Alternatively, a plurality of luminous modules of the lighting assembly may be incorporated into the same luminous device of a motor vehicle.

According to another aspect of the invention, a method for controlling luminous modules in a lighting assembly for a motor vehicle is proposed. Each luminous module is suitable for emitting a segmented light beam. The method is noteworthy in that it comprises the following steps:

i) in a control module, generating a digital control image comprising a plurality of digital image channels, the information contained in each image channel defining the outlines of a segmented light beam to be emitted by one of the luminous modules;

ii) transmitting, by means of a communication channel, the digital control image to each of said luminous modules.

Preferably, the method may furthermore comprise the following step:

iii) in each of the luminous modules, projecting a segmented light beam determined by a subset of the channels of the received digital control image.

Using the measures proposed by the embodiments of the present invention, it becomes possible to control a plurality of luminous modules that are able to emit a segmented or pixelated light beam with a common control processor having a single video output interface, while maintaining the ability to project different outlines with each luminous module. This decreases the number of connections required between a control unit and a plurality of projecting units, thereby decreasing the complexity of the system, and decreases the production cost thereof.

Figure 2:
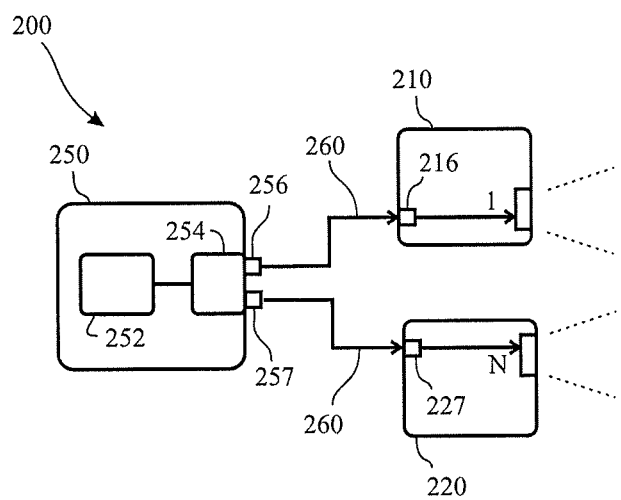
Figure 3:
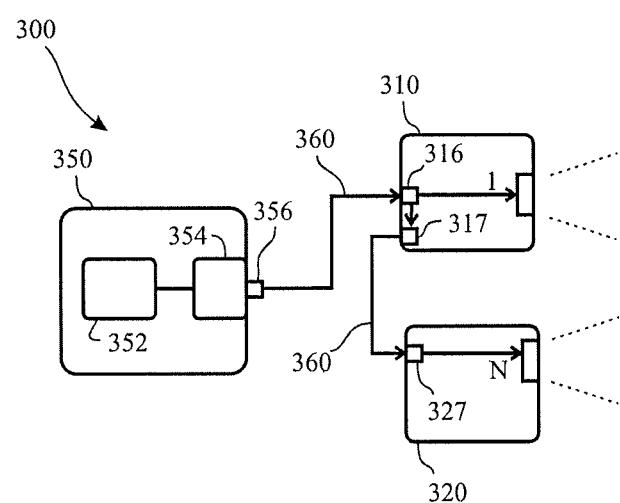

Other features and advantages of the present invention will be better understood from the description of the examples and of the drawings, in which:

FIG. 1 schematically shows a luminous module according to one preferred embodiment of the invention;

FIG. 2 schematically shows a luminous module according to one preferred embodiment of the invention;

FIG. 3 schematically shows a luminous module according to one preferred embodiment of the invention.

Unless specifically indicated otherwise, technical features described in detail for a given embodiment may be combined with the technical features described in the context of other embodiments described by way of nonlimiting example. Similar reference numbers will be used to reference similar concepts in the various embodiments of the invention. For example, the references 100, 200 and 300 designate three embodiments of a lighting assembly according to the invention.

The description concentrates on the technical aspects by which the embodiments of a lighting assembly according to the invention differ with respect to known solutions. Other technical elements required for operation of a lighting assembly, but which are well known to those skilled in the art, are not explained in detail in order to present the invention in a clear and concise manner. It is for example a question of electrical power-supply modules for supplying the luminous modules with power, and of units for controlling electrical current, or of optical modules comprising optical lenses, or even of heat-dissipating elements and mechanical supports. Likewise, the operation of the luminous modules that generate the segmented light beams, i.e. modules such as DMDs, matrix-array LED sources, laser-scanning sources or liquid-crystal displays, will not be detailed and is known in the art.

The illustration of FIG. 1 shows a schematic of a lighting assembly 100. A control unit 150, comprising by way of example a graphics processor capable of generating a digital control image 160, is operationally connected, by means of a communication channel, i.e. a channel for transmitting data, such as a video data bus, to a plurality of luminous modules, two modules 110 and 120 of which are illustrated. The luminous modules form part of a headlamp of a motor vehicle. In one alternative embodiment, the two luminous modules each form part of a different headlamp of a motor vehicle, for example the right front headlamp and left front headlamp, respectively. The digital image comprises a plurality of image channels. It is for example a question of red, green and blue channels (RGB channels).

Generally, it is known to record various components of a digital image in dedicated image channels, the composition of which gives the complete image. By way of example, the red component of each pixel is recorded in a matrix that represents the red channel, and so on. The combination of the channels gives the red, green and blue components of each pixel of the digital image.

In the context of the present invention, the digital control image 160 generated by the control unit 150 comprises a plurality of channels, each channel representing a matrix of pixels or of segments. The content of each matrix of segments is for example pre-recorded in a memory element to which the control unit has read access. For example, the memory element may contain a plurality of possible contents, depending on the luminous function that is to be produced by the luminous modules. When the control unit receives an order to produce a given luminous function, for example from a central control unit of the motor vehicle, the corresponding content is loaded from the memory element in order to generate the channels of the control image 160. The information of the first channel 1 comprise the control information for the first luminous module 110, whereas the information of the Nth channel comprise the control information for the luminous module of index N, 120. In other words, the digital image 160 of dimensions X times Y pixels or segments comprises N subimages of identical dimensions and which are determined for each of its channels. Each luminous module 110, 120 is configured so as to project a segmented light beam of dimensions X times Y pixels, corresponding to one of the received image channels, while ignoring the other channels of the digital control image. Each luminous module may be located in a different luminous projecting device (headlight) of the motor vehicle.

By way of example, if the luminous module 110 is a DMD, following reception of the digital control image, the micromirrors are positioned by the luminous module 110, which comprises as is known its own module for controlling the position of the micromirrors. The micromirrors are positioned so that the outline determined by the first image channel of the digital control image 160 is projected by the light beam reflected by the matrix array of micromirrors.

The illustration of FIG. 2 shows another embodiment of the lighting assembly 200 according to the invention. A control unit 250 comprises a graphics processor 252 capable of generating a digital control image 260 and a data-transmitting unit 254. It is for example a question of a data communication interface configured to transmit the segmented or matrix data contained in the channels of the digital control image 260 sequentially over the data-transmitting channel that connects the control unit 250 to the luminous modules 210, 220. The data-transmitting unit 254 comprises two data outputs 256 and 257, which are connected by two data-transmitting channels dedicated to the transmission of the same digital control image to each of the luminous modules 210 and 220, respectively. The same digital control image comprising the image channels 1 and N is transmitted to the two luminous modules. The luminous module 210 comprises a unit 216 for receiving data, such as a data communication interface suitable for reading the sequential data transmitted by the control unit, and for reconstructing therefrom the segmented or matrix information that corresponds uniquely to the first image channel of the digital control image. The resulting image 1 is then projected by the luminous module 210. The luminous module 220 comprises a unit 227 for receiving data, which unit is able to read the sequential data transmitted by the control unit, and for reconstructing therefrom the matrix information that corresponds to the image channel of index N of the digital control image. The resulting image N is then projected by the luminous module 220.

The illustration of FIG. 3 shows another embodiment of the lighting assembly 300 according to the invention. A control unit 350 comprises a graphics processor 352 capable of generating a digital control image 360, and a data-transmitting unit 354. It is for example a question of a data-communicating interface configured to transmit the segmented data contained in the channels of the digital control image 360 sequentially over the data-transmitting channel that connects the control unit 350 to the first luminous module 310. The data-transmitting unit 354 comprises a data output 356, which is connected by a data-transmitting channel to the first luminous module 310. The digital control image 360 comprising the image channels 1 and N is transmitted to the first luminous module. The first luminous module 310 comprises a data-receiving unit 316, such as a data-communicating interface suitable for reading the sequential data transmitted by the control unit, which is configured to reconstruct the matrix information that corresponds to the first image channel of the digital control image. The resulting image 1 is then projected by the luminous module 310. The first luminous module 310 furthermore comprises a data-transmitting unit 317 suitable for relaying or repeating the data of the digital control image 360 to a second luminous module 320. The second luminous module 320 comprises a data-receiving unit 327 suitable for reading the sequential data transmitted by the first module 310, and for reconstructing therefrom the segmented information that corresponds to the image channel of index N of the digital control image. The resulting image N is then projected by the luminous module 320. This chain arrangement may obviously be extended to a higher plurality of luminous modules, without however departing from the scope of the present invention.

In all the embodiments of the invention, a new digital control image may alternatively be transmitted at preset times. For example, the control unit 350 of FIG. 3 may be configured to emit a stream of digital control images at a frequency of 60 Hz. The resolution of a control image is advantageously identical to the projection resolution that the luminous modules are able to achieve, so that one segment of an image channel of the digital control image corresponds to one segment projected by one luminous module. At least one of the luminous modules may furthermore be configured to form a light beam that is determined by a combination of a plurality of image channels received with the digital control image. Alternatively, if a luminous module is capable of emitting light beams of different colours, the outline of each of the beams may be determined by one of the channels of the digital control image, without however departing from the scope of the present invention.

The scope of protection is determined by the following claims.

The invention claimed is:

1. A lighting assembly for a motor vehicle, the lighting assembly comprising:
   a plurality of arrays of light sources, each array of light sources including a matrix of pixels, each pixel corresponding to a light source being able to emit a pixelated light beam; and
   a control circuit electrically connected to the plurality of arrays of light sources, the control circuit including a graphic processor configured to generate a digital control image, the digital control image including a plurality of sub-images, each sub-image representing a matrix of channels, each channel corresponding to a pixel among a matrix of pixels of a corresponding array of light sources, the control circuit configured to transmit the digital control image to each of the plurality of arrays of light sources,
   wherein the control circuit generates the digital control image having a resolution that is identical to a resolution of a digital micromirror device being used to reflect pixelated light beams, and each array of light sources receives the digital control image and uses the digital micromirror device to project the pixelated light beams according to a corresponding sub-image of the received digital control image.

2. The lighting assembly according to claim 1, wherein the control circuit controls each of the plurality of arrays of light sources.

3. The lighting assembly according to claim 2, wherein each array of light sources is suitable for projecting a pixelated light beam determined by one of the channels of the digital control image.

4. The lighting assembly according to claim 2, wherein the control circuit comprises a plurality of data outputs, each of the data outputs being configured to transmit the digital control image to one of the arrays of light sources.

5. The lighting assembly according to claim 2, wherein the control circuit comprises a data output, the data output being configured to transmit the digital control image to a first of the arrays of light sources, the first of the arrays of light sources being configured to repeat the received digital control image to at least another of the arrays of light sources of the lighting assembly.

6. The lighting assembly according to claim 2, wherein the control circuit is configured to transmit a sequence of digital control images to the arrays of light sources.

7. The lighting assembly according to claim 2, wherein the digital control image comprises three types of channels, the three types of channels including a red image channel, a green image channel, and a blue image channel, and the plurality of arrays of light sources include at least three arrays of light sources, each of which is configured so as to project a pixelated light beam according to one of the three types of channels, respectively.

8. The lighting assembly according to claim 2, wherein each array of light sources comprises the digital micromirror device, or a monolithic matrix-array source comprising electroluminescent semiconductor elements, or a liquid-crystal display, or a laser-scanning projecting device.

9. The lighting assembly according to claim 1, wherein each array of light sources is suitable for projecting a pixelated light beam determined by one of the channels of the digital control image.

10. The lighting assembly according to claim 9, wherein the control circuit comprises a plurality of data outputs, each of the data outputs being configured to transmit the digital control image to one of the arrays of light sources.

11. The lighting assembly according to claim 1, wherein the control circuit comprises a plurality of data outputs, each of the data outputs being configured to transmit the digital control image to one of the arrays of light sources.

12. The lighting assembly according to claim 1, wherein the control circuit comprises a data output, the data output being configured to transmit the digital control image to a first of the arrays of light sources, the first of the arrays of light sources being configured to repeat the received digital control image to at least another arrays of light sources of the lighting assembly.

13. The lighting assembly according to claim 12, wherein the arrays of light sources are connected in a chain, so that each array of light sources, except the first, is configured so as to receive the digital control image from the array of light sources that precedes it in the chain.

14. The lighting assembly according to claim 1, wherein the arrays of light sources are capable of projecting a pixelated light beam having a resolution of at least 800 segments.

15. The lighting assembly according to claim 1, wherein the control circuit is configured to transmit a sequence of digital control images to the arrays of light sources.

16. The lighting assembly according to claim 1, wherein the digital control image comprises three types of channels, the three types of channels including a red image channel, a green image channel, and a blue image channel, and the plurality of arrays of light sources includes at least three arrays of light sources, each of which is configured so as to project a pixelated light beam according to one of the three types of channels, respectively.

17. The lighting assembly according to claim 1, wherein each array of light sources comprises the digital micromirror device, or a monolithic matrix-array source comprising electroluminescent semiconductor elements, or a liquid-crystal display, or a laser-scanning projecting device.

18. A method for controlling a plurality of arrays of light sources in a lighting assembly for a motor vehicle, each array of light sources including a matrix of pixels, each pixel corresponding to a light source being able to emit a pixelated light beam, the method comprising:

generating, by a graphic processor of a control circuit electrically connected to the plurality of arrays of light sources, a digital control image, the digital control image including a plurality of sub-images, each sub-image representing a matrix of channels, each channel corresponding to a pixel among a matrix of pixels of a corresponding array of light sources, the control circuit configured to transmit the digital control image to each of the plurality of arrays of light sources; and receiving the digital control image by each array of light sources and projecting pixelated light beams according to a corresponding sub-image of the received digital control image, wherein the control circuit generates the digital control image having a resolution that is identical to a resolution of a digital micromirror device being used to reflect the pixelated light beams, and each array of light sources uses the digital micromirror device to project the pixelated light beams according to a corresponding sub-image of the received digital control image.

19. The method according to claim 18, further comprising:

projecting, by each array of light sources, pixelated light beam determined by a subset of the channels of the received digital control image.

* * * * *